United States Patent
Eremenko et al.

(10) Patent No.: US 9,929,515 B2
(45) Date of Patent: Mar. 27, 2018

(54) SYSTEMS FOR MODULE INTERFACING OF MODULAR MOBILE ELECTRONIC DEVICES

(71) Applicant: Google Inc., Mountain View, CA (US)

(72) Inventors: Paul Eremenko, San Jose, CA (US); David Nathaniel Fishman, San Jose, CA (US); Seth Newburg, Arlington, MA (US); Ara N Knaian, Newton, MA (US); Boyan Kurtovich, Brighton, MA (US); Shahriar Khushrushahi, Cambridge, MA (US); Gad Amit, San Mateo, CA (US); Inbal Etgar, San Francisco, CA (US); Daniel Joseph Clifton, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/834,199

(22) Filed: Aug. 24, 2015

(65) Prior Publication Data

US 2016/0056587 A1 Feb. 25, 2016

Related U.S. Application Data

(60) Provisional application No. 62/040,860, filed on Aug. 22, 2014.

(51) Int. Cl.
*H01R 13/66* (2006.01)
*H01R 24/60* (2011.01)
(Continued)

(52) U.S. Cl.
CPC ........... *H01R 13/665* (2013.01); *H01R 24/60* (2013.01); *H04B 5/0012* (2013.01);
(Continued)

(58) Field of Classification Search
CPC .... H01R 13/665; H01R 24/60; H01R 13/629; H01R 13/6205; H04B 5/0075; H04B 5/0012; H04B 5/0037
(Continued)

(56) References Cited

U.S. PATENT DOCUMENTS

| 4,658,333 A | 4/1987 | Grimes |
| 4,856,088 A | 8/1989 | Oliwa et al. |

(Continued)

FOREIGN PATENT DOCUMENTS

WO 2013120723 A1 8/2013

OTHER PUBLICATIONS

International Search Report from PCT/US15/46587 dated Nov. 30, 2015—2 pages.

(Continued)

*Primary Examiner* — Edwin A. Leon
(74) *Attorney, Agent, or Firm* — Dority & Manning, P.A.

(57) ABSTRACT

A module interface of a modular electronic device includes a data interface, coupled to a module communication network of the modular electronic device, that enables data transfer between the module communication network and modules coupled to the data interface; a power interface, coupled to a module power network of the modular electronic device, that enables power transfer between the module power network and modules coupled to the power interface; and a mechanical interface, coupled to a chassis of the modular mobile electronic device, that enables modules to be removably and mechanically coupled to the modular electronic device.

15 Claims, 13 Drawing Sheets

(51) Int. Cl.
*H04B 5/00* (2006.01)
*H01R 13/62* (2006.01)
*H01R 13/629* (2006.01)

(52) U.S. Cl.
CPC ....... *H04B 5/0037* (2013.01); *H01R 13/6205* (2013.01); *H01R 13/629* (2013.01)

(58) Field of Classification Search
USPC ...................................... 439/38, 620.09, 676
See application file for complete search history.

(56) References Cited

U.S. PATENT DOCUMENTS

| | | | |
|---|---|---|---|
| 4,904,549 A | 2/1990 | Goodwin et al. | |
| 4,974,317 A | 12/1990 | Rodriguez, II et al. | |
| 5,822,183 A * | 10/1998 | Kanda | G06K 7/0047 361/679.32 |
| 5,828,341 A | 10/1998 | Delamater | |
| 5,895,230 A | 4/1999 | Bartley | |
| 5,983,303 A | 11/1999 | Sheafor et al. | |
| 6,862,173 B1 | 3/2005 | Konshak et al. | |
| 6,896,548 B2 * | 5/2005 | Scuteri | G06K 7/0021 439/326 |
| 7,238,038 B2 * | 7/2007 | Kumagai | G06K 7/0021 439/326 |
| 7,458,815 B2 | 12/2008 | Fallah-Adl et al. | |
| 7,509,094 B2 | 3/2009 | Moran et al. | |
| 7,618,260 B2 | 11/2009 | Daniel et al. | |
| 7,953,455 B2 | 5/2011 | Moran et al. | |
| 8,154,244 B1 | 4/2012 | Gorham et al. | |
| 8,180,395 B2 | 5/2012 | Moran et al. | |
| 8,249,656 B2 | 8/2012 | Sherman et al. | |
| 8,285,342 B2 | 10/2012 | Moran et al. | |
| 8,509,848 B1 | 8/2013 | Cole | |
| 2003/0118006 A1 | 6/2003 | Yang et al. | |
| 2004/0212941 A1 | 10/2004 | Haas et al. | |
| 2005/0190124 A1 | 9/2005 | Manabe | |
| 2007/0099593 A1 | 5/2007 | Thome et al. | |
| 2008/0028237 A1 | 1/2008 | Knight | |
| 2008/0168282 A1 | 7/2008 | Brundridge | |
| 2008/0197825 A1 | 8/2008 | Siri | |
| 2008/0224769 A1 | 9/2008 | Markowski et al. | |
| 2009/0124288 A1 | 5/2009 | Song et al. | |
| 2009/0167245 A1 | 7/2009 | Nguyen | |
| 2009/0280865 A1 | 11/2009 | Danis et al. | |
| 2010/0073202 A1 | 3/2010 | Mazed | |
| 2010/0220432 A1 | 9/2010 | Wise et al. | |
| 2010/0302028 A1 | 12/2010 | Desai et al. | |
| 2010/0323238 A1 | 12/2010 | Takahashi et al. | |
| 2011/0098087 A1 | 4/2011 | Tseng | |
| 2011/0157815 A1 | 6/2011 | Lin | |
| 2011/0179405 A1 | 7/2011 | Dicks et al. | |
| 2011/0264944 A1 | 10/2011 | Newman | |
| 2012/0293934 A1 | 11/2012 | Boduch et al. | |
| 2013/0008707 A1 | 1/2013 | Kim | |
| 2013/0026572 A1 | 1/2013 | Kawa et al. | |
| 2013/0091225 A1 | 4/2013 | Eaton | |
| 2013/0103212 A1 | 4/2013 | Andiappan | |
| 2013/0155600 A1 | 6/2013 | Ross et al. | |
| 2014/0009980 A1 | 1/2014 | Divan et al. | |

OTHER PUBLICATIONS

PCT International Preliminary Report on Patentability for corresponding PCT Application No. PCT/US2015/046587, dated Mar. 9, 2017—5 pages.

* cited by examiner

Perspective View

Cross-Sectional View

Pin / Socket Coupling

Capacitive Pad Coupling

Pin / Socket Coupling

Capacitive Pad Coupling

Crescent planar inductors
(4x)

SYSTEMS FOR MODULE INTERFACING OF MODULAR MOBILE ELECTRONIC DEVICES

CROSS-REFERENCE TO RELATED APPLICATIONS

This application claims the benefit of U.S. Provisional Application No. 62/040,860, filed on 22 Aug. 2014, all of which is incorporated in its entirety by this reference.

TECHNICAL FIELD

This invention relates generally to the mobile electronics field, and more specifically to new and useful systems for module interfacing of a modular mobile electronic device in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Modular mobile electronic devices may serve to meet user needs and preferences; but for modules to work as part of a modular mobile electronic device, modules must be able to interface with the modular mobile electronic device. Typical modular add-ons to mobile electronic devices suffer from poor interface design; they are often not secure when attached, break easily, and are not designed for repeated connection and disconnection. These qualities make users less inclined to use add-ons, decreasing their value. Thus, there is a need in mobile electronics field to create systems for module interfacing of modular mobile electronic devices. This invention provides such new and useful systems.

DESCRIPTION OF THE INVENTION EMBODIMENTS

Figure 1:
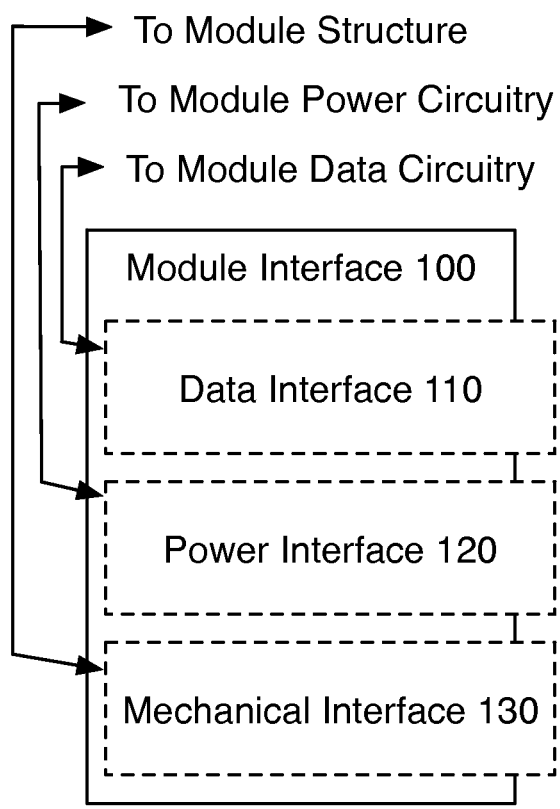
FIG. 1 is a chart view of a module interface of an invention embodiment.

The following description of the embodiments of the invention is not intended to limit the invention to these invention embodiments, but rather to enable any person skilled in the art to make and use this invention.

Systems and methods for module interfacing of modular mobile electronic devices of invention embodiments function to facilitate a mechanical and electrical coupling of a module to a mobile electronic device while functionally promoting the interchange, re-organization, and customization of modules of a modular mobile electronic device. Through the use of user-removable modules, modular mobile electronic devices may be created and/or modified. When multiple modules are connected, the modules are preferably enabled, in confederation, to serve as a mobile electronic device. The mobile electronic device created by such a confederation is preferably characterized by the confederated modules as well as the parameters of confederation, which are preferably determined by the confederated modules and any system enabling the confederation of the modules. A modular mobile electronic device configured to serve as a smartphone is an example of a possible mobile electronic device. Other examples of possible mobile electronic devices include those configured to serve as tablets, laptops, media players, cameras, measurement devices, gaming systems, vehicular computing devices, set-top boxes, and televisions.

Modules are preferably user-removable and replaceable, enabling users to create mobile electronic devices with highly varied form and functionality. For example, a user may connect a camera module, a flash memory module, a processor module, a battery module, and a touchscreen LCD module to a modular mobile electronic device to create a small and lightweight camera. The user could later add a cell-phone radio module and a microphone/speaker module to create a camera phone. Modules preferably follow an open and free standard, enabling third party developers and entities to develop modules.

The flexibility afforded by module confederation preferably allows for a number of favorable outcomes. Users can purchase only the modules necessary for their needs, allowing for reductions in cost. Users can also choose to replace modules or add additional modules at a later time. In combination, these two outcomes may help increase accessibility to mobile electronic devices (and in many cases, the internet) throughout the world, especially for people for whom a smartphone or a PC is not currently a good value proposition. For example, a user may buy a system and a basic set of modules at a low price point, and transition to a more advanced phone by adding modules later on. These two outcomes may also help slow the creation of electronic waste by allowing mobile electronic devices to be upgraded or modified rather than replaced. Further, because modular mobile electronic devices are compatible with modules of highly varied form and function, and because modules are preferably based on an open standard, module confederation may allow small or specialized companies to make modules playing to their strengths without designing a full mobile electronic device.

Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

The following text and figures describe systems and methods for enabling and/or implementing module interfacing for modular mobile electronic devices. The modular mobile electronic devices are preferably those of U.S. Provisional Application No. 61/976,173 and/or U.S. Provisional Application No. 61/976,195, which are incorporated in their entirety by this reference. The modular mobile electronic devices may additionally or alternatively be any suitable modular mobile electronic devices.

Figure 2:
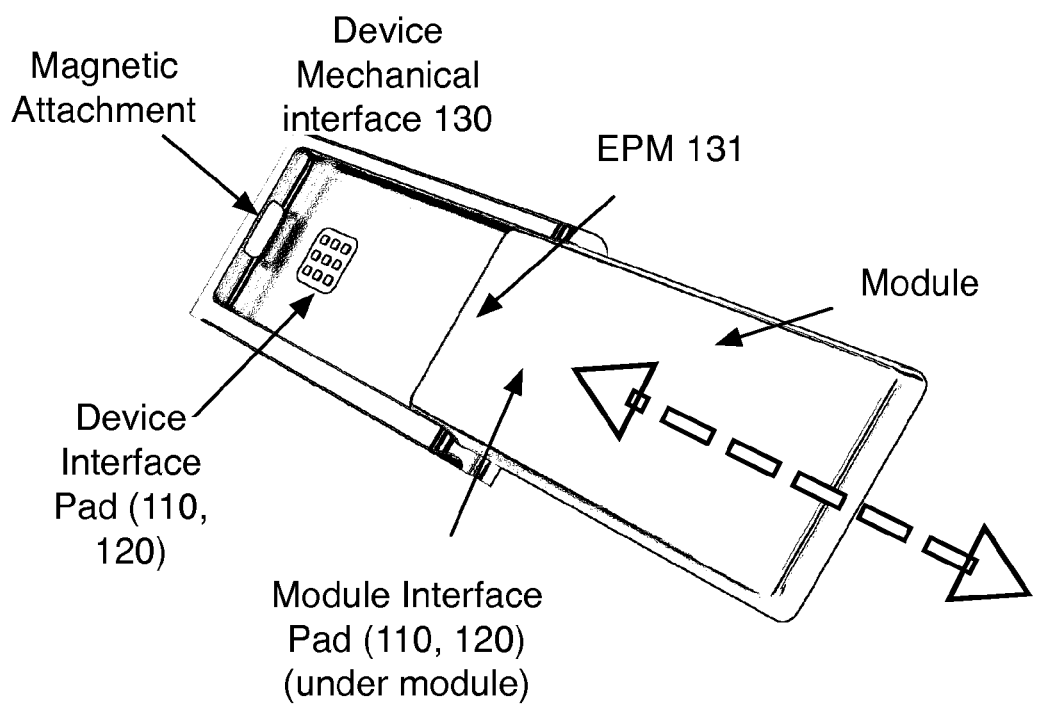
FIG. 2 is a model view of a module interface of an invention embodiment.
Figure 2:
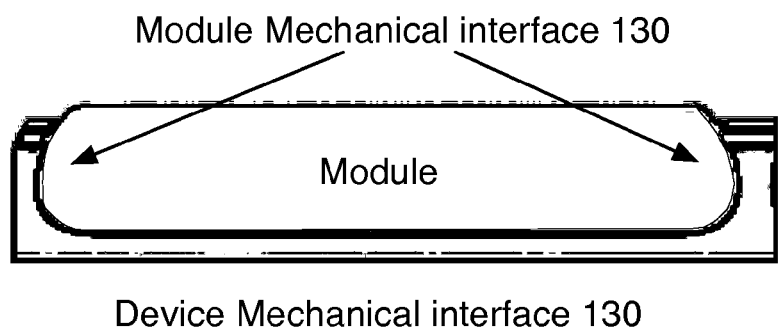
Figure 3:
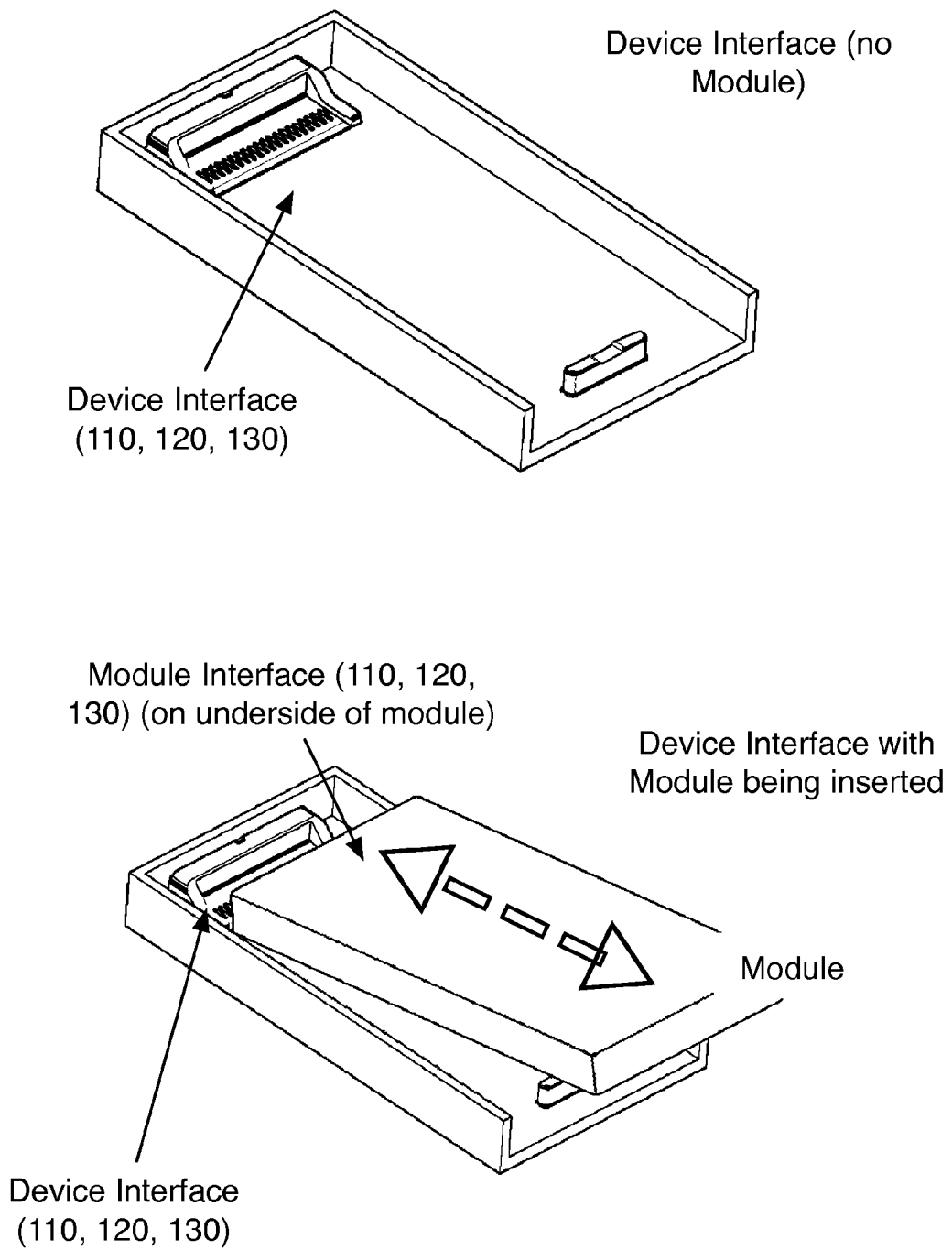
FIG. 3 is a model view of a module interface of an invention embodiment.

As shown in FIG. 1, a module interface 100 includes at least one of a data interface 110, a power interface 120, and a mechanical interface 130. The module interface 100 preferably includes a data interface no, a power interface 120, and a mechanical interface 130; but may alternatively include only one or only two of the preceding three interface types. More specifically, as shown in FIG. 2, the module interface 100 of a first invention embodiment includes an interface pad having a capacitive data interface 110 and a conductive power interface 120, and a mechanical interface 130 having mechanical rails and an electropermanent magnet interface. As shown in FIG. 3, the module interface 100 of a second invention embodiment includes a conductive data interface no, a conductive power interface 120, and a mechanical interface 130 having mechanical rails; in this embodiment, the pins of the conductive interfaces 110 and 120 also aid in mechanical coupling. The module and modular mobile electronic device preferably have complementary interface pads; the module preferably has an electropermanent magnet while the modular mobile electronic device has a complementary magnetic attachment point. When the module is slid into the modular mobile electronic device, the mechanical rails enable the module to be guided into an attachment position, where the interface pads of the module and the modular electronic device are aligned; then, the electropermanent magnet is activated to secure the module in that position. Additionally or alternatively, the modular mobile electronic device may have an electropermanent magnet while the module has a complementary magnetic attachment point.

Figure 4A:
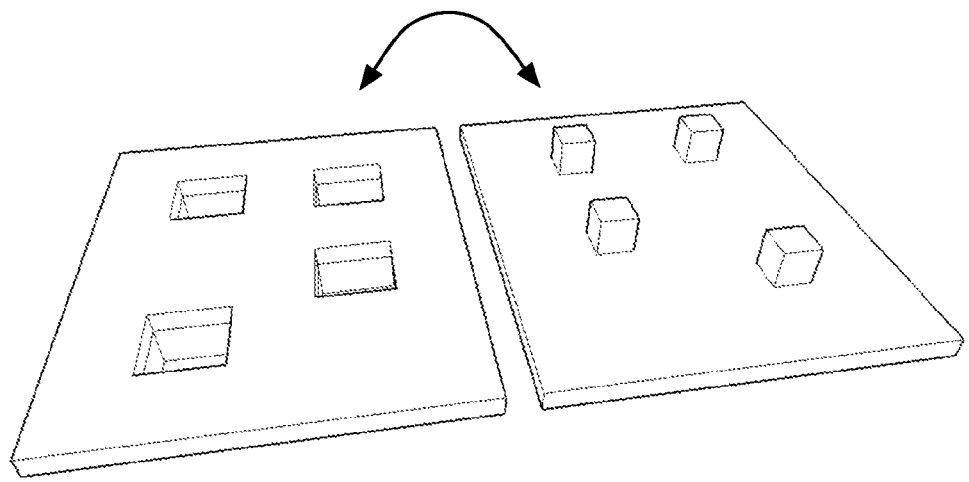
FIGS. 4A, 4B, 4C, and 4D are example views of module interfaces of an invention embodiment.
Figure 4B:
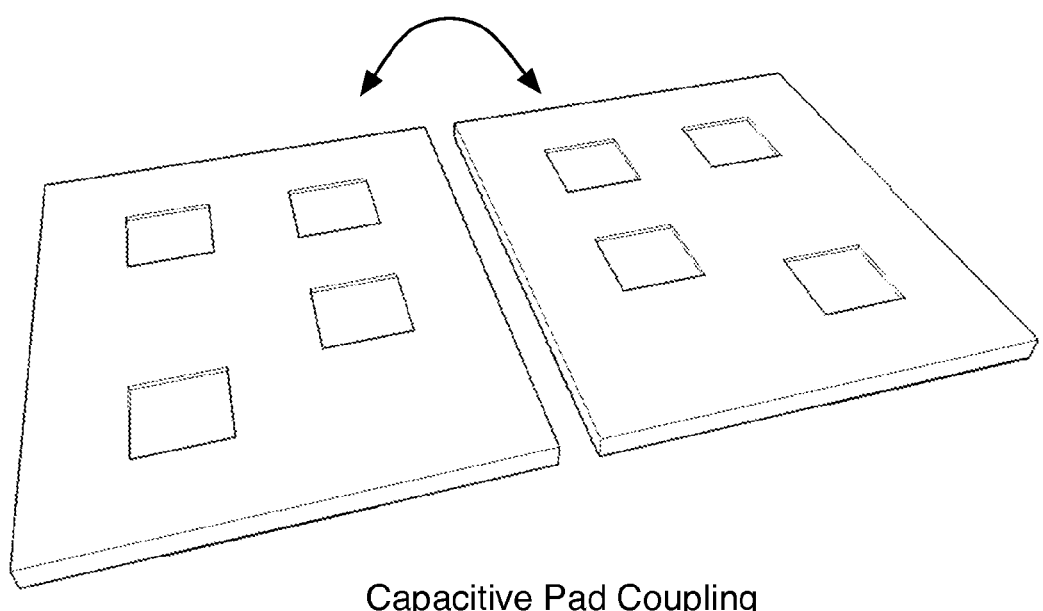
Figure 4C:
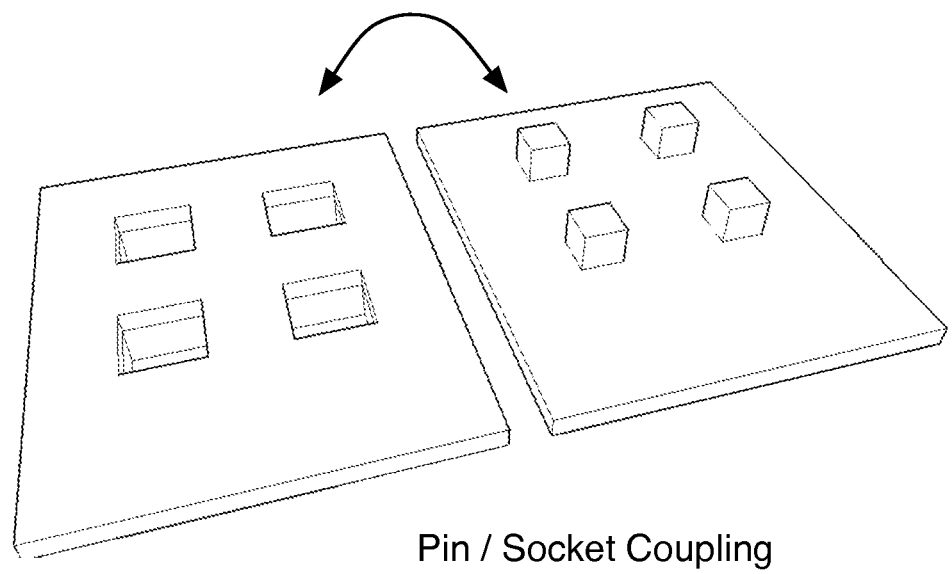
Figure 4D:
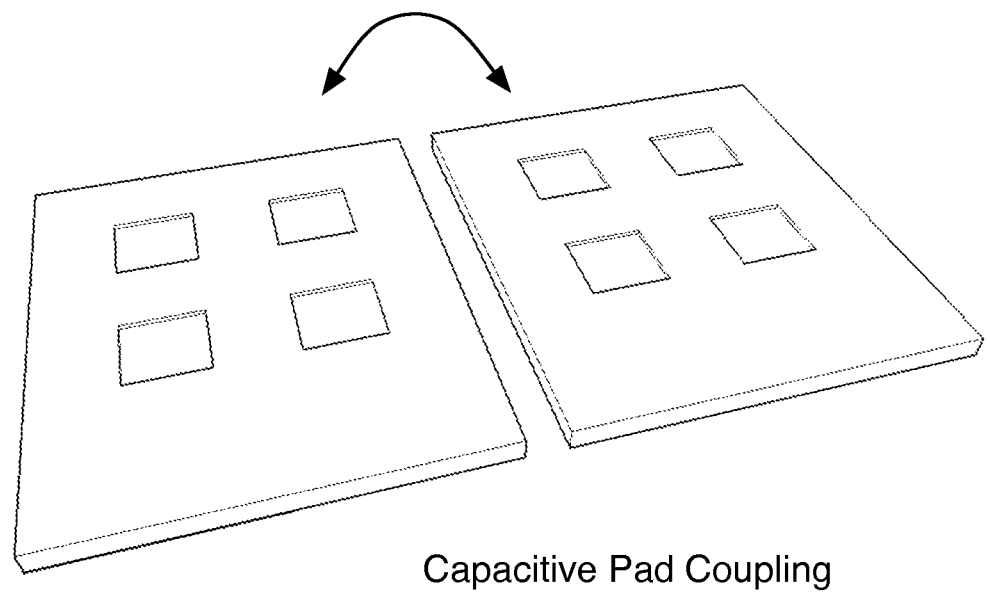

Module interfaces 100 function to enable removable coupling (e.g. data coupling, power coupling, and/or mechanical coupling) between a module and a modular mobile electronic device and/or another module. Each module and each modular mobile electronic device preferably has at least one module interface 100. The module interfaces 100 of the module and the modular mobile electronic device are preferably complementary in both orientation and coupling mechanism, but not necessarily identical (although they may additionally be identical in either or both of orientation and coupling mechanism). As shown in FIG. 4A, an example pair of module interfaces 100 are complementary in coupling mechanism and in orientation, but identical in neither. As shown in FIG. 4B, an example pair of module interfaces 100 are complementary in coupling mechanism and orientation, and are identical in coupling mechanism but not orientation. As shown in FIG. 4C, an example pair of module interfaces 100 are complementary in coupling mechanism and orientation, and are identical in orientation but not coupling mechanism. As shown in FIG. 4D, an example pair of module interfaces 100 are complementary in coupling mechanism and orientation, and are identical in both orientation and coupling mechanism.

A module interface 100 of a module is preferably fixed to the module, but may additionally or alternatively be removable from the module. Likewise, a module interface 100 of a modular mobile electronic device is preferably fixed to the modular mobile electronic device, but may additionally or alternatively be removable from the modular mobile electronic device.

Data Interface

The data interface 110 functions to enable data coupling of modules to a modular mobile electronic device and/or to other modules. The data interface 110 preferably enables modules to transfer data to or receive data from a module communication network of a mobile modular electronic device, another module, and/or any other suitable system. If the data interface 110 is part of the module interface 100 of a module, the data interface 110 is preferably internally connected to the circuitry of the module, but may additionally or alternatively be connected to the module in any suitable way. If the data interface no is part of a module interface 100 of a modular mobile electronic device, the data interface no is preferably internally connected to a module communication network of the modular mobile electronic device, but may additionally or alternatively be connected to the modular mobile electronic device in any suitable way. The data interface 110 is preferably internally connected with conductive wires, but may additionally or alternatively be internally connected in any suitable way. For example, the data interface no may be internally connected using optical connections. In this example, the data interface 110 might include light emitters and detectors; the light might be passed through fiber optics, through an optical backplane, or through another type of waveguide or optical circuit component. Alternatively, the data interface no may include optical fiber connectors that pass light from internal fiber optic connections directly to the data interface 110 without conversion to an electrical signal.

The data interface 110 preferably enables data coupling via capacitive coupling; the data interface no of a module preferably may couple capacitively to a data interface 110 of a modular mobile electronic device and/or of another module. The data interface 110 may additionally or alternatively enable data coupling via other types of electrical coupling (e.g. inductive, direct/conductive), optical coupling, sonic coupling, or any other method of coupling suitable for data coupling. The data interface 110 may enable data coupling via multiple types of coupling; for instance, the data interface no may transmit some data using inductive coupling and some using capacitive coupling.

Figure 5:
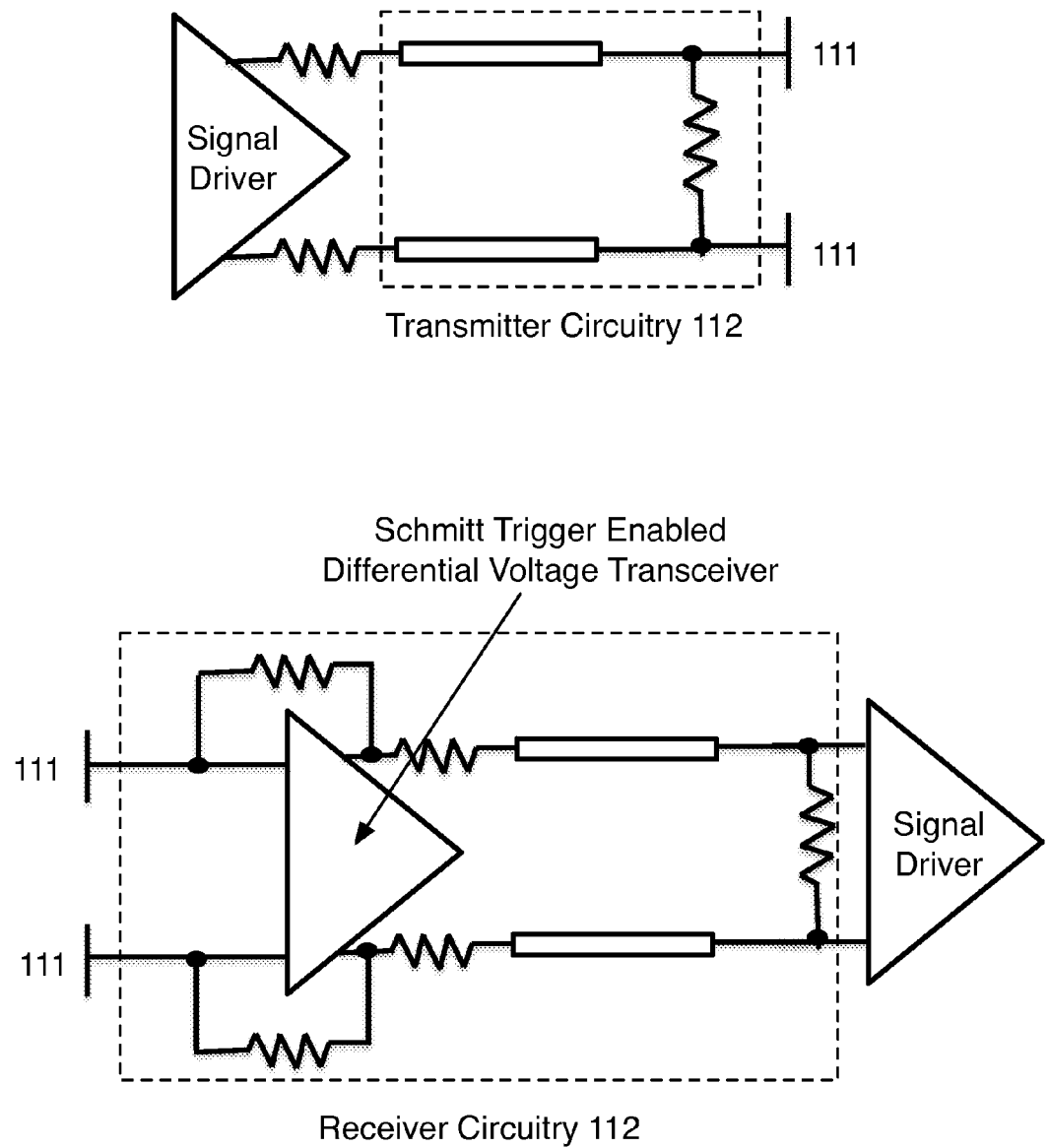
FIG. 5 is a schematic view of a data interface of a module interface of an invention embodiment.

As shown in FIG. 5, if the data interface 110 enables data coupling via capacitive coupling, the data interface no preferably includes capacitive coupling pads in and capacitive coupling circuitry 112.

The capacitive coupling pads 111 function to capacitively couple to capacitive coupling pads on another module interface 100. The capacitive coupling pads 111 are preferably positioned such that when two module interfaces 100 are aligned (i.e. they are positioned to couple), the capacitive coupling pads 111 have a small distance between them, creating a capacitance between the two sets of capacitive coupling pads in. The small distance is preferably around 0.5 mm, but may additionally or alternatively be any distance. Capacitive coupling is enabled by the air gap between the two sets of capacitive coupling pads 111. The capacitive coupling pads 111 may be recessed in the module interface 100 to create this gap. Additionally or alternatively (for instance, if the capacitive coupling pads 111 have a dielectric coating), there may be no gap between the capacitive coupling pads 111.

The capacitive coupling pads 111 are preferably made of a conductive material (e.g. metal), but may additionally or alternatively be made of any suitable materials. In one variation, the capacitive coupling pads may be made of a conductive material coated with a dielectric material; the dielectric material may serve to alter the capacitance between two sets of capacitive coupling pads 111, and/or to protect the surface of the capacitive coupling pads 111.

The capacitive coupling pads 111 are preferably circular in shape, but may additionally or alternatively be of any shape (e.g. square, rectangular, spiral, polygonal, etc.). The capacitive coupling pads 111 preferably have a uniform thickness but may additionally or alternatively have non-uniform thickness.

The data interface 110 preferably includes multiple capacitive coupling pads 111 that are of identical shape, but additionally or alternatively may include capacitive coupling pads 111 of different shapes. Capacitive coupling pads 111 may be of different shapes for different signal frequency ranges.

The capacitive coupling pads 111 are preferably separated by a suitable distance to prevent excessive crosstalk between capacitive coupling pads 111.

The capacitive coupling pads 111 are preferably connected to the capacitive coupling circuitry 112 by conductive wires or traces, but may additionally or alternatively be connected by any suitable method.

Figure 6:
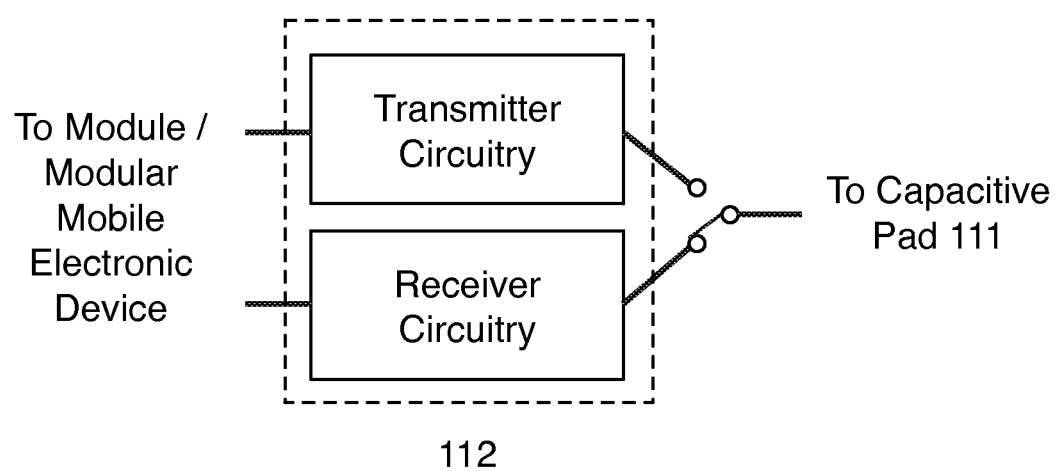
FIG. 6 is a diagram view of a data interface of a module interface of an invention embodiment.

The capacitive coupling circuitry 112 functions to convert the voltage at and/or current through the capacitive coupling pads 111 into an electrical signal usable by the module (if the data interface 110 is of a module) or by the modular mobile electronic device (if the data interface no is of a modular mobile electronic device). In particular, the capacitive coupling circuitry 112 preferably converts analog AC signals received by the capacitive coupling pads 111 into digital AC signals. Additionally or alternatively, the capacitive coupling circuitry 112 may convert the signals from any suitable received signal type to any signal type usable by the module/modular mobile electronic device. The capacitive coupling circuitry 112 is preferably separated into transmitter and receiver circuitry. If a capacitive coupling pad 111 is meant only for transmission, it might be connected only to transmitter circuitry; if it is meant for only reception, it might be connected to only receiver circuitry. As shown in FIG. 6, if a capacitive coupling pad 111 is meant for both transmission and reception, it might include switched transmission and reception circuitry.

Receiver circuitry preferably includes a Schmitt trigger implemented by a comparator or another hysteresis-based receiver such that pulses may converted into latched states.

In one implementation, the capacitive coupling circuitry 112 connects to low-voltage differential signaling (LVDS) or scalable low-voltage signaling (SLVS) drivers in the module/modular mobile electronic device. In this implementation, the transmission circuitry includes two microstrip transmission lines connected to the differential outputs of an LVDS/SLVS driver and a resistor connecting the two lines, as shown in FIG. 5. One capacitive coupling pad 111 is connected to each side of the resistor. The receiver circuitry includes two microstrip transmission lines, a Schmitt trigger-enabled differential voltage transceiver connected to the two microstrip transmission lines and the capacitive coupling pads 111, and a resistor connecting the two microstrip transmission lines. The resistor is then connected to a LVDS/SLVS driver.

The capacitive coupling circuitry 112 may include any circuitry that processes, translates, or converts the signal received or transmitted at capacitive coupling pads 111. This may include receivers, drivers, amplifiers, buffers, translators, or any other suitable signal processing components, arranged in any suitable manner.

Figure 7:
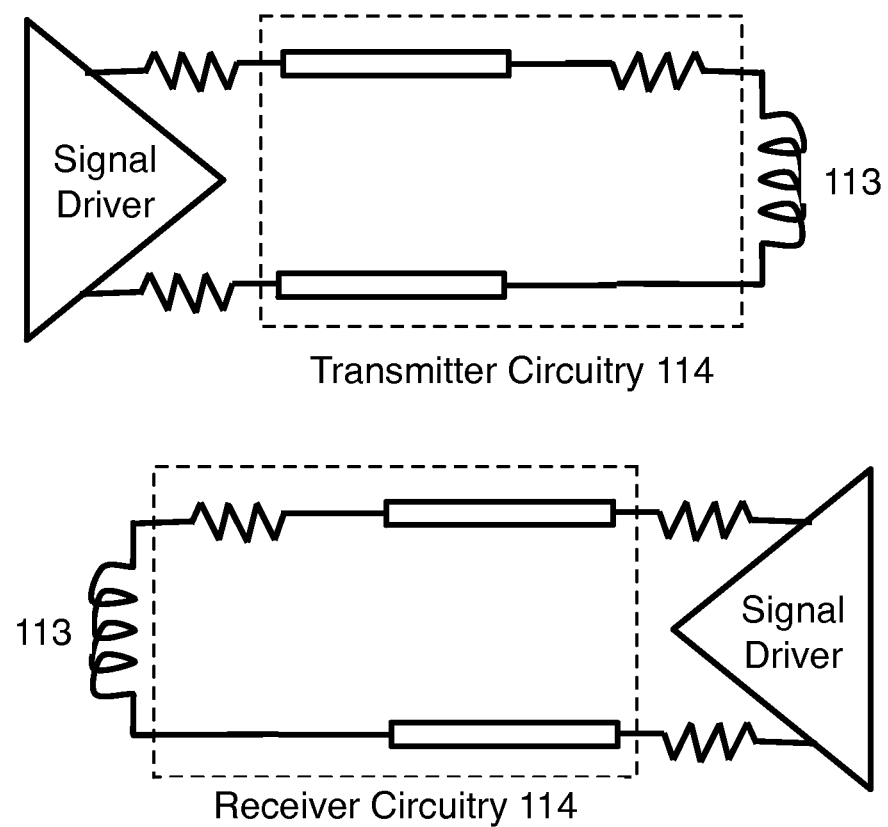
FIG. 7 is a diagram view of a data interface of a module interface of an invention embodiment.

As shown in FIG. 7, if the data interface 110 enables data coupling via inductive coupling, the data interface no preferably includes inductive coupling pads 113 and inductive coupling circuitry 114.

The inductive coupling pads 113 function to inductively couple to inductive coupling pads on another module interface 100. The inductive coupling pads 113 are preferably positioned such that when two module interfaces 100 are aligned (i.e. they are positioned to couple), the inductive coupling pads 113 have a small distance between them. When current flows through one of the inductive coupling pads 113, a voltage is induced in the opposite inductive coupling pad 113. Inductive coupling is enabled by the air gap between the two sets of inductive coupling pads 113. The inductive coupling pads 113 may be recessed in the module interface 100 to create this gap. Additionally or alternatively (for instance, if the inductive coupling pads 113 have a dielectric coating), there may be no gap between the inductive coupling pads 113.

The inductive coupling pads 113 are preferably made of a conductive material (e.g. metal), but may additionally or alternatively be made of any suitable materials. In one variation, the inductive coupling pads 113 may be made of a conductive material coated with a dielectric material; the dielectric material may serve to alter the inductance between two sets of inductive coupling pads 113, and/or to protect the surface of the inductive coupling pads 113.

Figure 8:
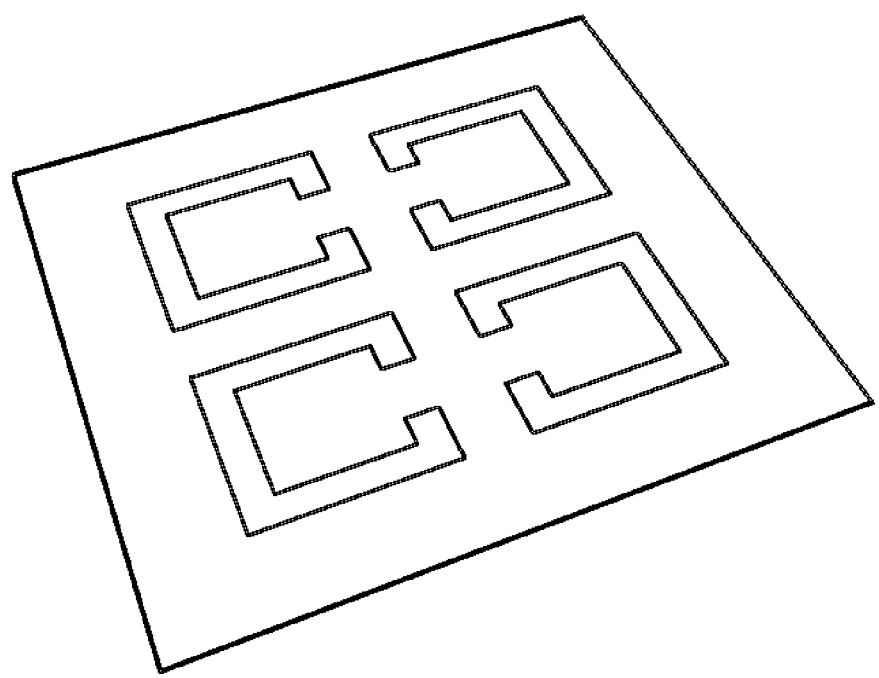
FIG. 8 is a model view of inductive coupling pads of a module interface of an invention embodiment.

As shown in FIG. 8, the inductive coupling pads 113 are preferably of the form of a planar crescent inductor, but may additionally or alternatively be of the form of a planar spiral inductor, Halbach inductor, or any other suitable form of inductor. The inductive coupling pads 113 may have a uniform thickness (as in the case of a planar crescent or spiral inductor) or a non-uniform thickness (as in the case of a Halbach inductor). The data interface 110 preferably includes multiple inductive coupling pads 113 that are of identical shape, but additionally or alternatively may include inductive coupling pads 113 of different shapes. Inductive coupling pads 113 may be of different shapes for different signal frequency ranges.

The inductive coupling pads 113 are preferably separated by a suitable distance to prevent excessive crosstalk between inductive coupling pads 113.

The inductive coupling pads 113 are preferably connected to the inductive coupling circuitry 114 by conductive wires or traces, but may additionally or alternatively be connected by any suitable method.

The inductive coupling circuitry 114 functions to convert the voltage across and/or current through the inductive coupling pads 113 into an electrical signal usable by the module (if the data interface no is of a module) or by the modular mobile electronic device (if the data interface no is of a modular mobile electronic device). In particular, the inductive coupling circuitry 114 preferably converts analog AC and/or DC signals received by the inductive coupling pads 113 into digital AC and/or DC signals. Additionally or alternatively, the inductive coupling circuitry 114 may convert the signals from any received signal type to any signal type usable by the module/modular mobile electronic device. The inductive coupling circuitry 114 is preferably identical for transmitting and receiving; additionally or alternatively, the inductive coupling circuitry may be separated into distinct transmitting and receiving circuitry.

In one implementation, the inductive coupling circuitry 114 connects to low-voltage differential signaling (LVDS) or scalable low-voltage signaling (SLVS) drivers in the module/modular mobile electronic device. In this implementation, the inductive coupling circuitry 114 includes two microstrip transmission lines connected to the differential outputs of an LVDS/SLVS driver and an inductive coupling pad connecting the two lines.

The inductive coupling circuitry 114 may include any circuitry that processes, translates, or converts the signal received or transmitted at inductive coupling pads 113. This may include receivers, drivers, amplifiers, buffers, translators, or any other suitable signal processing components, arranged in any suitable manner.

Figure 9:
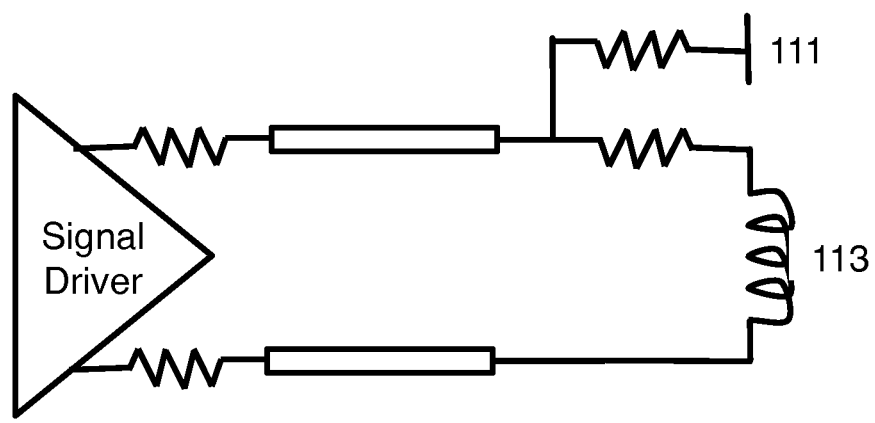
FIG. 9 is a diagram view of a data interface of a module interface of an invention embodiment.

As shown in FIG. 9, in one variation of an invention embodiment, the data interface 110 includes both capacitive coupling pads 111 and inductive coupling pads 113. In this variation, the coupling circuitry may be a combination of the capacitive coupling circuitry 112 and the inductive coupling circuitry 114 or any other suitable coupling circuitry. Using a combination of capacitive and inductive coupling enables coupling across a larger variety of coupling frequencies than either coupling type does independently.

If the data interface 110 enables data coupling via conductive coupling, the data interface 110 preferably includes conductive couplers. The conductive couplers are preferably any couplers that enable electrical conduction, including spring pins, pins and sockets, and/or friction contacts. In some cases, conductive couplers may include flexible metal pins that deform when initiating contact before 'latching' into a lower energy state (the energy required to bend the flexible pins as well as the energy to overcome friction generated in part due to the increased normal force of the pins pressing against each other may aid in module retention). An example of such conductive couplers is as shown in FIG. 3. These pins may be thought of as a hybrid of spring pins and friction contacts.

The conductive couplers are preferably made of a conductive material (e.g. metal) and are preferably connected to the module/modular mobile electronic device via conductive wires or traces, but may additionally or alternatively be connected by any suitable method. The conductive couplers may additionally or alternatively be connected to the module/modular mobile electronic device through conductive coupling circuitry, which may include any circuitry that processes, translates, or converts the signal received or transmitted at conductive couplers. This may include receivers, drivers, amplifiers, buffers, translators, or any other suitable signal processing components, arranged in any suitable manner.

Figure 10:
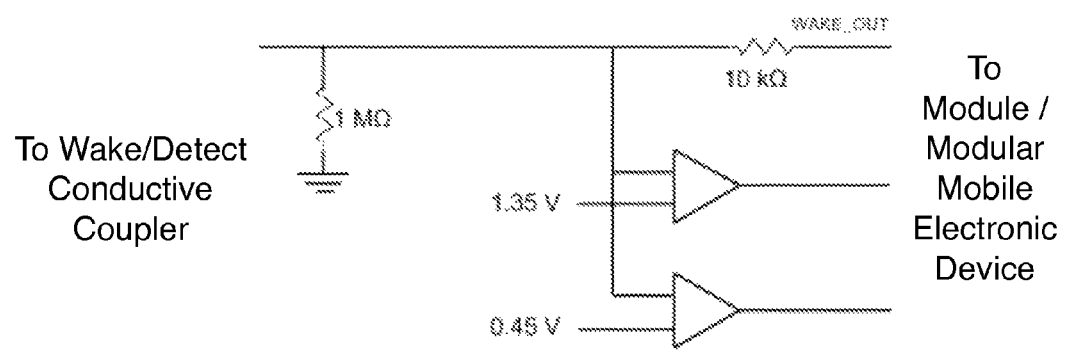
FIG. 10 is a schematic view of conductive coupling circuitry of a data interface of a module interface of an invention embodiment.
Figure 11:
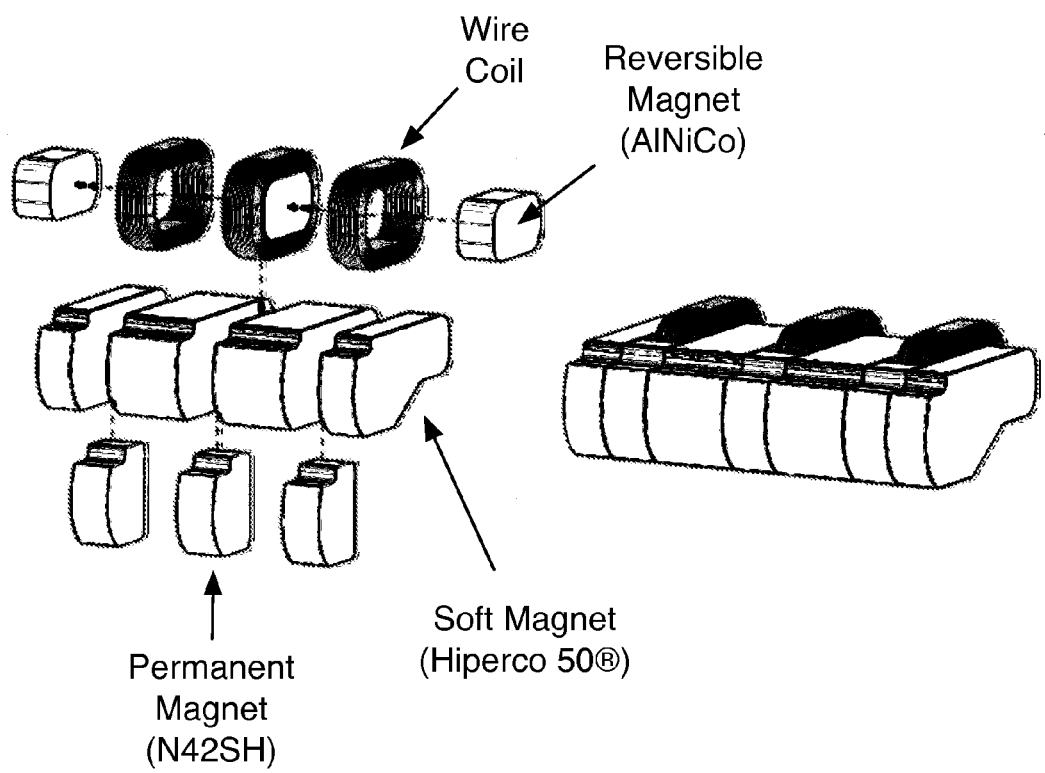
FIG. 11 is a model view of an EPM of a mechanical interface of a module interface of an invention embodiment; and, FIG. 12 is a diagram view of EPM circuitry of a module interface of an invention embodiment.

In one implementation, conductive coupling circuitry may include wake/detect circuitry, as shown in FIG. 10. Wake/detect circuitry is preferably used with a designated wake/detect pin to signal module detect and wake events. In the example circuit of FIG. 10, the wake/detect circuitry utilizes two analog comparators to allow for a number of different sensed voltages at the modular mobile electronic device and/or the module that can be used for wake or detection events.

For example, the device may pull each wake-detect pin up to 1.8 V by default. A module may pull its wake-detect pin down to o V by default when the module is uncoupled. When the module is first coupled, the voltage on both wake-detect pins will float to 0.9V. This transition may be used to signal a module insertion event. Modules may wake a sleeping device by pulsing the wake-detect pin temporarily low (e.g., <0.64V) and then returning to 0.9V. Likewise, the device may wake a sleeping module by pulsing the wake-detect pin high (e.g., >1.285V) and then returning to 0.9V.

If the data interface 110 enables data coupling via optical coupling, the data interface 110 preferably includes optical couplers. Optical couplers may include fiber optic couplers, free space optical couplers, or any other couplers that allow light to be transmitted or received through the data interface no.

Power Interface

The power interface 120 functions to enable power coupling of modules to a modular mobile electronic device and/or to other modules. The power interface 120 preferably enables modules to transfer power to or receive power from a module power network of a mobile modular electronic device, another module, and/or any other suitable system. If the power interface 120 is part of the module interface 100 of a module, the power interface 120 is preferably internally connected to the circuitry of the module, but may additionally or alternatively be connected to the module in any suitable way. If the power interface 120 is part of a module interface 100 of a modular mobile electronic device, the power interface 120 is preferably internally connected to a module power network of the modular mobile electronic device, but may additionally or alternatively be connected to the modular mobile electronic device in any suitable way. The power interface 120 is preferably internally connected with conductive wires, but may additionally or alternatively be internally connected in any suitable way.

The power interface 120 preferably enables power coupling via conductive coupling; the power interface 120 of a module preferably may couple conductively to a power interface 120 of a modular mobile electronic device and/or of another module. The power interface 120 may additionally or alternatively enable power coupling via other types of electrical coupling (e.g. inductive, capacitive), optical coupling, sonic coupling, or any other method of coupling suitable for power coupling. The power interface 120 may enable power coupling via multiple types of coupling; for instance, the power interface 120 may transmit some power using inductive coupling and some using conductive coupling.

If the power interface 120 enables power coupling via conductive coupling, the power interface 120 preferably conductively couples using spring pins and complementary pads, but may additionally or alternatively couple using pins and sockets, friction pads, or using any other suitable method. The power interface 120 may enable conductive coupling substantially similarly to the conductive coupling described for the data interface 110. The power interface 120 may be arranged such that when the power interface 120 couples to another power interface, the ground connection is made first, followed by the power connection. This may be accomplished, for example, by the ground connection having a larger pad than the power connection. Alternatively, this may be accomplished by positioning the ground and power pins in any manner such that the ground pins are contacted before power pins. If the power interface 120 is part of a module interface 100 including a data interface 110, the power interface 120 preferably couples before the data interface no does, protecting the connections to the data interface no.

If the power interface 120 enables power coupling via capacitive coupling, the power interface preferably includes capacitive coupling pads and capacitive coupling circuitry. The capacitive coupling pads are preferably substantially similar to the capacitive coupling pads 111, but may additionally or alternatively be any suitable type of capacitive coupler. In particular, the capacitive coupling pads used for power transfer may be substantially larger than the capacitive coupling pads 111 used for data transfer.

The capacitive coupling circuitry functions to enable the transmission of power over the capacitive coupling pads. The capacitive coupling circuitry is preferably separated into transmitter and receiver circuitry. If a capacitive coupling pad is meant only for transmission, it might be connected only to transmitter circuitry; if it is meant for only reception, it might be connected to only receiver circuitry. If a capacitive coupling pad is meant for both transmission and reception, it might include switched transmission and reception circuitry.

The transmitter circuitry preferably functions to convert power from a form used by the module/modular mobile electronic device to an AC power signal transmitted over the capacitive coupling pads; the receiver circuitry preferably functions to convert power from an AC power signal received over the capacitive coupling pads to a form used by the module/modular mobile electronic device.

The transmitter circuitry may include a series resonant converter circuit or other circuit that converts DC power (e.g. battery power) into AC power that may be transmitted over the capacitive coupling pads. The receiver circuitry may include a bridge rectifier or other circuit that converts AC power received over the capacitive coupling pads into DC power usable by a module/modular mobile electronic device.

The capacitive coupling circuitry may include any circuitry that processes, translates, or converts the power signal received or transmitted at capacitive coupling pads. This may include receivers, drivers, amplifiers, buffers, translators, or any other suitable power signal processing components, arranged in any suitable manner.

If the power interface 120 enables power coupling via inductive coupling, the power interface 120 preferably includes inductive coupling pads and inductive coupling circuitry.

The inductive coupling pads are preferably substantially similar to the inductive coupling pads 113, but may additionally or alternatively be any suitable type of inductive coupler. In particular, the inductive coupling pads used for power transfer may be substantially larger than the inductive coupling pads 113 used for data transfer.

The inductive coupling circuitry functions to enable the transmission of power over the inductive coupling pads. The inductive coupling circuitry is preferably separated into transmitter and receiver circuitry. The inductive coupling circuitry preferably includes in both transmitter and receiver circuitry tuned LC circuits to enable resonant inductive coupling. The transmitter circuitry preferably functions to convert power from a form used by the module/modular mobile electronic device to an oscillating power signal transmitted over the inductive coupling pads; the receiver circuitry preferably functions to convert power from an oscillating power signal induced in the inductive coupling pads to a form used by the module/modular mobile electronic device. The transmitter circuitry and receiver circuitry are preferably tuned to the same resonant frequency to enable high efficiency inductive power transfer; both circuits may have tunable capacitors or inductors to enable dynamic resonance tuning.

The inductive coupling circuitry may include any circuitry that processes, translates, or converts the power signal received or transmitted at inductive coupling pads. This may include receivers, drivers, amplifiers, buffers, translators, or any other suitable power signal processing components, arranged in any suitable manner.

Mechanical Interface

The mechanical interface 130 functions to enable mechanical coupling of modules to a modular mobile electronic device and/or to other modules. The mechanical interface 130 is preferably substantially similar to the mechanical interfaces of U.S. Provisional Application No. 61/976,195 (specifically, the module couplers and complementary module body shape). As shown in FIGS. 2 and 3, the mechanical interface 130 of the modular mobile electronic device preferably includes mechanical rails that are complementary to the module shape. These rails preferably hold the modules securely, but also allow modules to be removed when desired. The rails preferably substantially limit module movement when modules are fully coupled to allow for precise alignment (e.g. to align contact pads of the data interface 110 and power interface 120) but may additionally or alternatively allow some module movement along some degree of freedom. The mechanical rails preferably aid in module retention through friction. The guides are preferably defined by a cavity with a geometric profile that is complementary to at least a portion of the profile of a module as shown in FIG. 2. The cavity additionally includes an open portion that enables insertion of a module from along at least one axis; e.g., axial motion and/or rotational motion of a module into the space defined by the cavity. The open portion preferably restricts insertion to a single axis (i.e., modules may be inserted only along a line, as shown in FIG. 2), but may additionally or alternatively allow insertion in multiple axes). The open portion may further restrict insertion to a single direction (as shown in FIG. 2), or may allow insertion to occur in multiple directions per axis (e.g., modules that may be inserted from either the left or the right). Additionally or alternatively, the mechanical interface may be of any shape and structure that enables mechanical coupling of a module to a modular mobile electronic device and/or another module.

In addition to the mechanical interfaces of U.S. Provisional Application No. 61/976,195, the mechanical interface 130 may include an electropermanent magnet (EPM) interface to assist and/or enable mechanical coupling.

If the mechanical interface 130 includes an EPM interface, the mechanical interface preferably includes an EPM 131 and EPM circuitry 132. The EPM interface functions to provide a low-power, electronically controllable means to securely attach modules to other modules and/or modular mobile electronic devices. The EPM interface preferably has two selectable states: an attached state and a released state, corresponding to high and low levels of magnetic force. Power is required when switching between the attached state and released state, but power is preferably not required to maintain either state. EPM interfaces preferably provide enough magnetic force (in conjunction with a soft magnet, permanent magnet, or EPM of another module interface 100) in the attached state to prevent modules from being mechanically de-coupled; in the released state, EPMs 131 preferably provide a slight retaining force, allowing modules to be mechanically de-coupled with a small applied force. A soft magnet is preferably formed of soft magnetic material (e.g. annealed iron, the alloy known as Hiperco 50®). Additionally or alternatively, the EPMs 131 may provide no retaining force or may provide a repelling force, potentially allowing modules to be mechanically de-coupled without an applied force. If the mechanical interface includes mechanical rails as previously described (or otherwise accepts module insertion along a single direction), the EPM 131 preferably couples to a magnetic material on a surface perpendicular to the direction of modular insertion, as shown in FIG. 2. Coupling on a surface perpendicular to the direction of modular insertion preferably reduces the amount of shear force experienced at the interface and therefore increases coupling strength. Additionally or alternatively, the EPM 131 may couple to a magnetic material in any location that aids in module mechanical coupling.

In a variation of an invention embodiment, the mechanical interface 130 includes an EPM sunken into the surface of the mechanical interface 130. The module has a corresponding magnetic insert block that is spring-mounted to the module such that in a default state the spring holds the magnetic insert below the surface of the module (i.e., the magnetic insert does not stick out of the module). When the module is positioned over the EPM and the EPM is in an attached state, the magnetic force of the EPM on the magnetic insert pulls the magnetic insert into the EPM depression on the surface of the mechanical interface 130, preventing the module from moving in a direction perpendicular to the vertical direction (i.e., the direction the magnetic insert moves).

As shown in FIGURE ii, the EPM 131 functions to provide, in conjunction with a soft magnet, permanent magnet, or EPM on another module interface 100, a magnetic force. In one implementation, the EPM 131 is constructed of alternating N42SH (sintered neodymium-iron-boron) magnets and alnico (aluminum-nickel-cobalt) magnets surrounded by wire coil, separated by the alloy known as Hiperco 50®. The N42SH magnets are magnetized parallel to the long axis of the EPM 131, with each alternating N42SH magnet magnetized opposite to the previous N42SH magnet. The Alnico magnets are preferably magnetized together in one of two states: either in the same direction as the corresponding N42SH magnets (corresponding to the attach state) or in the opposite direction of the corresponding N42SH magnets (corresponding to the release state). Additionally or alternatively, some Alnico magnets are magnetized opposite and some are magnetized in the same direction as the corresponding N42SH magnets, creating a state with magnetic holding force in between that of the attach and release states.

Figure 12:
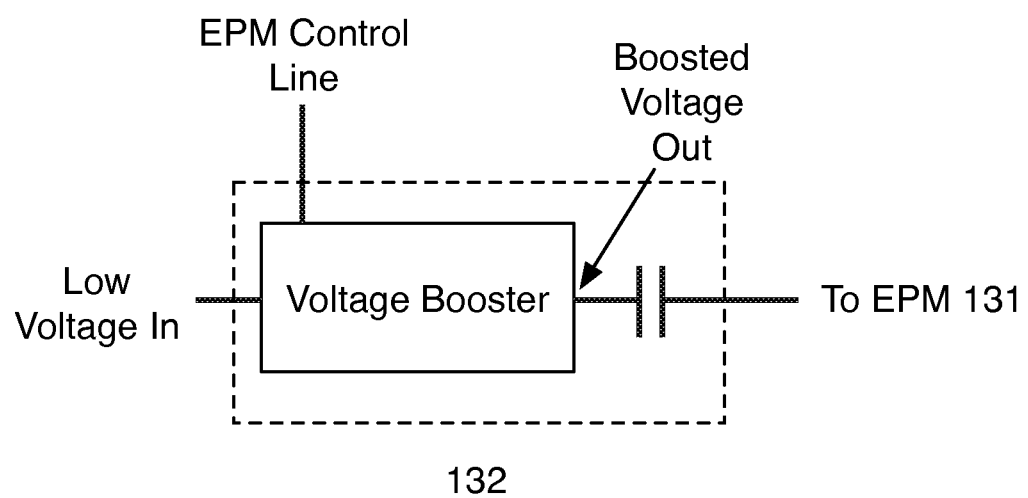

As shown in FIG. 12, the EPM circuitry 132 functions to switch the EPM 131 from one state to another. The EPM circuitry 132 preferably includes a boost circuit to increase supply voltage and a high-value capacitor to store current. The EPM circuitry 132 preferably charges the high value capacitor and then discharges it in a high current pulse across the wire coils of the EPM 131, enabling an EPM state change. The wire coils may receive current pulses individually or together; further, more than one current pulse per wire coil may be used to enable the EPM state change.

In one implementation, the EPM circuitry 132 discharges a 10 microfarad capacitor charged to 28V for 22 microseconds, resulting in a short high-current pulse. This high current pulse is first discharged into a first coil of the EPM 131. After a 10 millisecond period, the high current pulse is discharged into a second coil of the EPM 131; after another 10 millisecond period, the high current pulse is discharged into a third coil of the EPM 131. This three pulse cycle is repeated four times to fully change the EPM state of the EPM 131.

As a person skilled in the art will recognize from the previous detailed description and from the figures and claims, modifications and changes can be made to the embodiments of the invention without departing from the scope of this invention defined in the following claims.

We claim:

1. A module interface of a modular electronic device comprising:
   a data interface, coupled to a module communication network of the modular electronic device, that enables data transfer between the module communication network and modules coupled to the data interface, wherein the data interface comprises a first set of conductive contacts, and wherein data transfer between the module communication network and the modules coupled to the data interface is enabled by conductive coupling between the first set of contacts and the modules coupled to the data interface;
   a power interface, coupled to a module power network of the modular electronic device, that enables power transfer between the module power network and modules coupled to the power interface, wherein the power interface comprises a second set of conductive contacts, and wherein power transfer between the module power network and the modules coupled to the power interface is enabled by conductive coupling between the second set of contacts and the modules coupled to the power interface; and
   a mechanical interface, coupled to a chassis of the modular electronic device, that enables a plurality of modules to be removably and mechanically coupled to the modular electronic device, wherein the mechanical interface includes mechanical rails that aid in module retention through friction, wherein the mechanical interface includes an electropermanent magnet that aids in module retention, and wherein the electropermanent magnet is coupled to the modular electronic device by EPM circuitry, the EPM circuitry comprising a voltage booster and a capacitor.

2. The module interface of Claim 1, further comprising conductive coupling circuitry coupled to a wake/detect contact of the first set of conductive contacts, the conductive coupling circuitry including two voltage comparators.

3. The module interface of claim 2, wherein the first set of conductive contacts and the second set of conductive contacts comprise flexible metal pins that deform temporarily when the module interface is coupled to a module.

4. The module interface of claim 1, wherein the first set of conductive contacts and the second set of conductive contacts comprise flexible metal pins that deform temporarily when the module interface is coupled to a module.

5. The module interface of claim 1, wherein the data interface comprises a set of inductive coupling pads and inductive coupling circuitry; wherein the set of inductive coupling pads is coupled to the module communication network by the inductive coupling circuitry; wherein data transfer between the module communication network and modules coupled to the data interface is enabled by inductive coupling between the set of inductive coupling pads and the modules coupled to the data interface.

6. The module interface of claim 5, wherein the set of inductive coupling pads is coupled to the module communication network by a set of tuned LC circuits.

7. The module interface of Claim 1, wherein the data interface comprises a set of capacitive coupling pads and capacitive coupling circuitry; wherein the set of capacitive coupling pads is coupled to the module communication network by the capacitive coupling circuitry; wherein data transfer between the module communication network and modules coupled to the data interface is enabled by capacitive coupling between the set of capacitive coupling pads and the modules coupled to the data interface.

8. The module interface of claim 7, wherein the capacitive coupling circuitry comprises switched transmit/receive circuitry; wherein the capacitive coupling circuitry enables both transmission and reception of data for a capacitive coupling pad of the set of capacitive coupling pads.

9. A module interface of a module comprising:
a data interface, coupled to the module, that enables data transfer between the module and a module communication network of a modular electronic device coupled to the data interface;
a power interface, coupled to the module, that enables power transfer between the module and a module power network of the modular electronic device coupled to the power interface; and
a mechanical interface, coupled to the module, that enables the module to be removably and mechanically coupled to a modular electronic device comprising a plurality of removable modules, wherein the mechanical interface includes mechanical rails that aid in module retention through friction, wherein the mechanical interface includes an electropermanent magnet that aids in module retention, wherein the electropermanent magnet is coupled to the module by EPM circuitry, the EPM circuitry comprising a voltage booster and a capacitor.

10. The module interface of claim 9, wherein the data interface comprises a first set of conductive contacts; wherein data transfer between the module communication network and the module is enabled by conductive coupling between the first set of contacts and the modular electronic device; wherein the power interface comprises a second set of conductive contacts; wherein power transfer between the module power network and the module is enabled by conductive coupling between the second set of contacts and the modular electronic device.

11. The module interface of claim 10, wherein the first set of conductive contacts and the second set of conductive contacts comprise flexible metal pins that deform temporarily when the module interface is coupled to the modular electronic device.

12. The module interface of claim 9, wherein the data interface comprises a set of inductive coupling pads and inductive coupling circuitry; wherein the set of inductive coupling pads is coupled to the module by the inductive coupling circuitry; wherein data transfer between the module communication network and the module is enabled by inductive coupling between the set of inductive coupling pads and the modular electronic device.

13. The module interface of claim 12, wherein the set of inductive coupling pads is coupled to the module by a set of tuned LC circuits.

14. The module interface of claim 9, wherein the data interface comprises a. set of capacitive coupling pads and capacitive coupling circuitry; wherein the set of capacitive coupling pads is coupled to the module by the capacitive coupling circuitry; wherein data transfer between the module communication network and the module is enabled by capacitive coupling between the set of capacitive coupling pads and the modular electronic device.

15. The module interface of claim 14, wherein the capacitive coupling circuitry comprises switched transmit/receive circuitry; wherein the capacitive coupling circuitry enables both transmission and reception of data for a capacitive coupling pad of the set of capacitive coupling pads.

* * * * *